(No Model.) 2 Sheets—Sheet 1.

W. H. BOFINGER & A. O. TANNENBERG.
FAN ATTACHMENT FOR ROCKING CHAIRS.

No. 549,431. Patented Nov. 5, 1895.

Witnesses
Percy C. Bowen
J. C. Wilson

Inventors
W. H. Bofinger +
A. O. Tannenberg,
by Whitman & Wilkinson,
Attorneys.

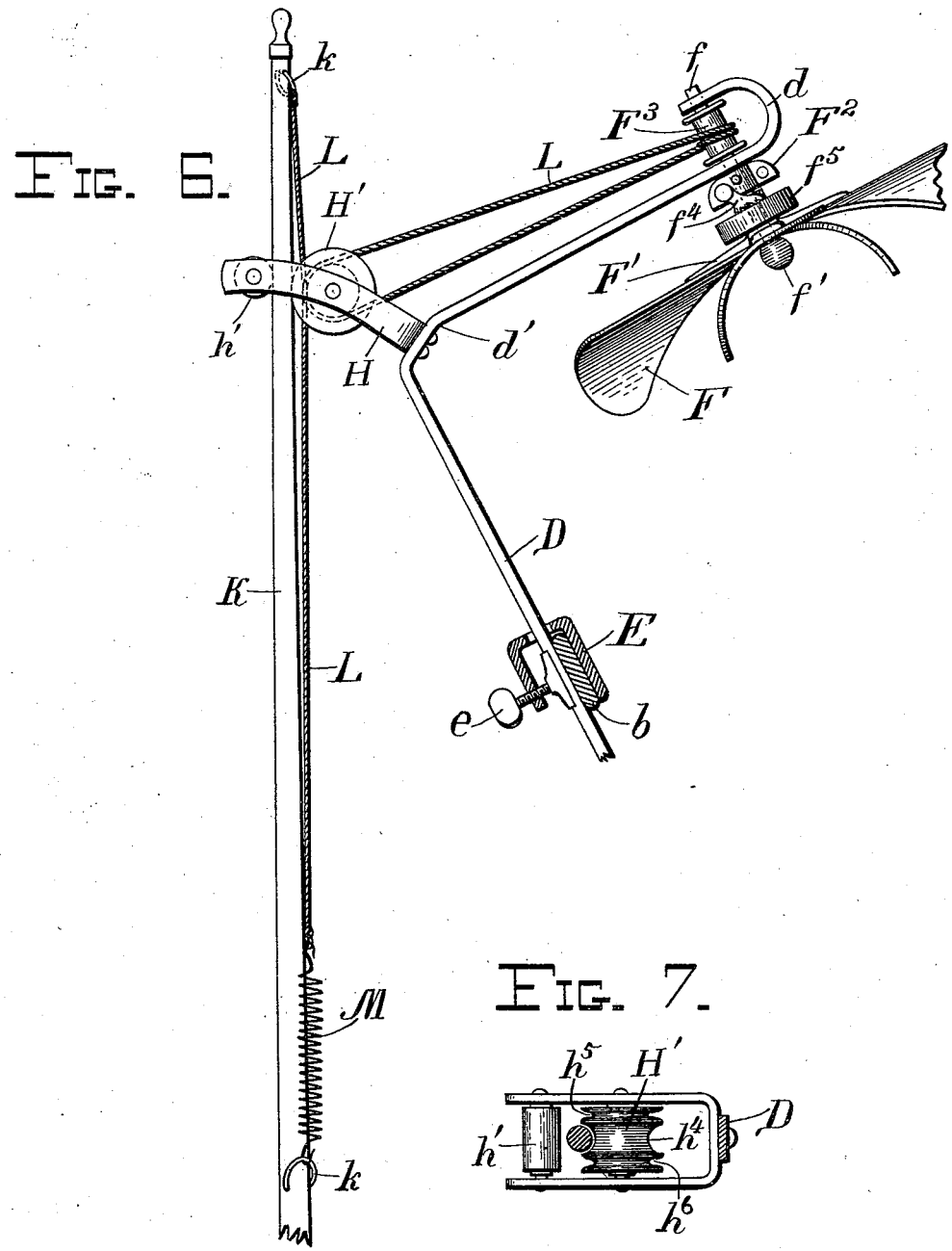

UNITED STATES PATENT OFFICE.

WILLIAM H. BOFINGER AND AUGUST O. TANNENBERG, OF NEW ORLEANS, LOUISIANA; SAID TANNENBERG ASSIGNOR TO SAID BOFINGER.

FAN ATTACHMENT FOR ROCKING-CHAIRS.

SPECIFICATION forming part of Letters Patent No. 549,431, dated November 5, 1895.

Application filed August 1, 1894. Serial No. 519,206. (No model.)

*To all whom it may concern:*

Be it known that we, WILLIAM H. BOFINGER and AUGUST O. TANNENBERG, citizens of the United States, residing at New Orleans, in the parish of Orleans and State of Louisiana, have invented certain new and useful Improvements in Fan Attachments for Rocking-Chairs; and we do hereby declare the following to be a full, clear, and exact description of the invention, such as will enable others skilled in the art to which it appertains to make and use the same.

Our invention relates to improvements in fan attachments for rocking-chairs or cradles; and it consists of certain novel features hereinafter described and claimed.

Reference is had to the accompanying drawings, wherein the same parts are indicated by the same letters throughout the several views.

Figure 1:
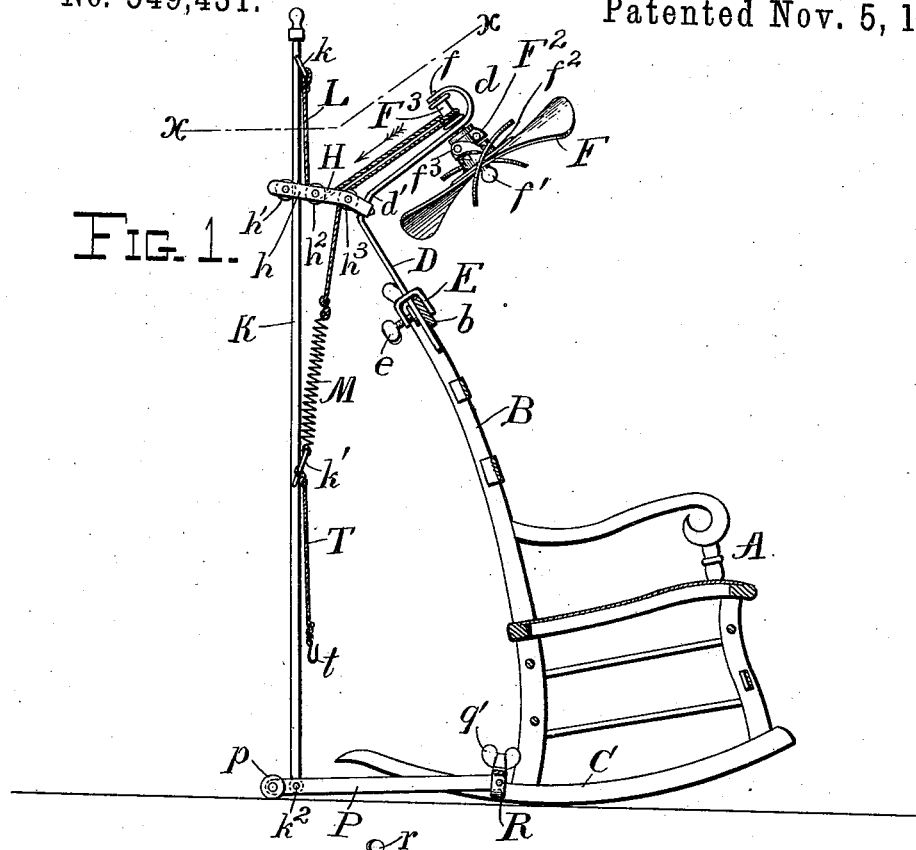
Figure 3:
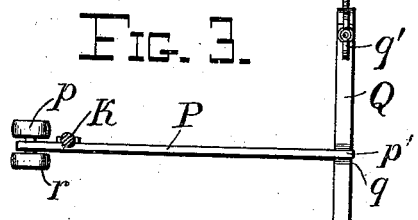
Figure 2:
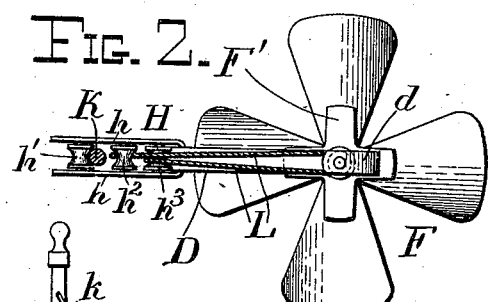
Figure 4:
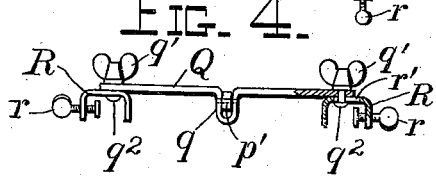
Figure 5:
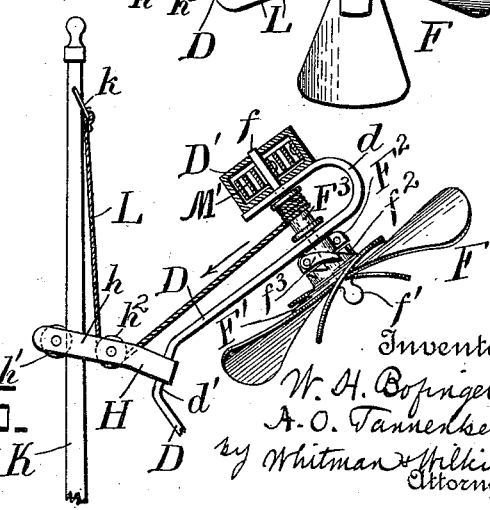

Figure 1 represents a central longitudinal section through a rocking-chair of ordinary construction, and illustrates the method of attaching our improved device thereto. Fig. 2 represents a section along the line $x\,x$ of the upper part of the apparatus shown in Fig. 1 and looking down. Fig. 3 represents a plan view of the lower part of the apparatus as detached from the chair. Fig. 4 represents a front view, partly in section, of the cross-piece to be attached to the rockers, as shown in Fig. 3 in plan; and Fig. 5 represents a view of a slightly-modified form of the apparatus, in which a coil-spring is used instead of the spiral spring shown in Fig. 1. Fig. 6 represents a side elevation, partly in section, of a modified form of the apparatus, in which a grooved roller is used in place of the two small rollers shown in Fig. 1 and a rubber disk is used in place of the ratchet-wheel. Fig. 7 represents a plan view of the frame shown in Fig. 6 for supporting the rollers.

A represents the chair provided with a back B, having an upper cross-piece $b$, as is commonly the case in rocking-chairs.

C represents one of the rockers of the chair.

D represents the fan-support, consisting of a bent plate or strip of metal which is secured to the cross-piece $b$ of the chair by means of the clamp E and its clamp-screw $e$ of any suitable construction. The upper end of the metal piece D is bent, as at $d$, to form journal-bearings for the shaft $f$, on which the fan F is revolubly mounted. This fan is held on the shaft $f$ by means of a set-collar $f'$, which is preferably made in the form of a ball or some other ornamental design. The blades of the fan are secured to the cruciform piece $F'$, to the back of which is rigidly attached a ratchet-wheel or roughened disk $f^2$, in which engages the pawl $f^3$, pivoted to the set-collar $F^2$ on the shaft $f$. The spool or drum $F^3$, fast on the shaft $f$, serves to hold the shaft in its journals, and at the same time gives sufficient frictional contact with the cord L, wound thereon, to revolve the shaft, as will be hereinafter described.

The ratchet-wheel $f^2$ may be made of fibrous material or rubber, or a plain soft-rubber disk $f$ may be used, as shown in Fig. 6, and the pawl $f$ may be metal, wood fiber, hard rubber, or any suitable material to engage therein, or any other suitable ratchet-and-pawl connection which makes very little noise may be adopted, if desired.

To the bent portion $d'$ of the fan-support D a frame H is rigidly secured. This frame carries three rollers $h'$, $h^2$, and $h^3$ between the brackets $h$, and between the outer two of these rollers the standard K slides freely. This standard K is provided with eyes $k$ and $k'$, to which the cord L and the spring M are attached, as shown in Fig. 1. The cord, after passing under the roller $h^2$ and being wound one or more times around the spool $F^3$, passes over the roller $h^3$ and down to the spring M, to which it is attached, while the said spring is under the required degree of tension.

The standard K is pivotally attached, as at $k^2$, to the bar P, carrying at one end the roller $p$ and being pivoted at the other end to the cross-bar Q, which should preferably be bent, as at $q$, to form a pivot-bearing for the said end $p'$ of the bar P. This cross-bar Q is connected by the clamp-nuts $q'$ to the clamps R, which are themselves provided with clamp-screws $r$ and are slotted at their upper central portions $r'$ to have a small lateral play on the clamp-screw $q^2$, as shown in Fig. 4.

It will be obvious that the slots may be formed in the cross-bar Q, and the clamp-screws $q'$ may pass through the said slots and be screwed into the clamps R should this construction be found desirable in practice.

It will be seen that by this arrangement of clamp-screws and clamps the device may be adjusted to rocking-chairs of various widths, as well as to rockers of different thickness.

In the form of device shown in Fig. 5, instead of the spiral spring M an initial tension is put on the cord L by means of the coil-spring M', which is secured at one end to the shaft $f$ and at the other to the box D', rigidly attached to the metal piece D. In this modified form of device the roller $h^3$ is omitted from the frame H as unnecessary, but two rollers being required, and the cord L is fastened at one end to the eye $k$ and at the other end to the spool $F^3$, passing around the roller $h^2$.

In the form of device shown in Figs. 6 and 7 the rollers $h^2$ and $h^3$ are both omitted and in their stead a single roller H', having a central annular groove $h^4$ of the proper size to admit the standard K, and smaller annular grooves $h^5$ and $h^6$ for the cord L, which latter passes from the upper end of the standard K around the under side of the roller H' in the groove $h^5$, then around the spool $F^3$, and back over the upper side of the roller H' in the groove $h^6$, and down to the spring M, as will be readily understood. In lieu of the ratchet-wheel $f^2$ and pawls $f^3$ we may use a soft-rubber disk $f^5$ and pawls $f^4$, having teeth like a saw upon their lower faces, which come in contact with the upper side of the soft-rubber disk. Thus as the shaft $f$ and set-collar $F^2$ are rotated in one direction by the backward movement of the chair the points of the teeth will be pressed into the soft rubber by frictional contact, and thus turn the rubber and fan with the shaft. When the shaft is turned in the opposite direction, (by the forward movement of the chair,) the pawls will be drawn back freely over the rubber, while the fan continues to revolve by its momentum until the backward movement of the chair gives it another turn. In either case the operation of the device is the same. As the chair is rocked backward, the frame H slides down on the standard K, causing the roller $h^2$ to drag the cord L around the spool $F^3$ in the direction shown by the arrow, and consequently causing the shaft $f$ to revolve in the direction that will make the pawl $f^3$ engage in the ratchet-wheel $f^2$. Thus it will be seen that as the chair rocks backward the fan will be caused to revolve, and the momentum thus acquired will be sufficient to keep it revolving in the same direction while the chair rocks forward.

In the device shown in Figs. 1 and 2 the tension of the spring M should be sufficient to hold the cord taut and cause the same to pass freely around the spool $F^3$ and over the rollers $h^2$ and $h^3$ as the chair rocks forward. During the forward motion of the chair the shaft $f$ will be driven by the cord in the opposite direction, but during this time the pawl will slip over the ratchet-wheel, while the fan continues to revolve, due to the energy imparted to it by the backward motion of the chair.

In the form of device shown in Fig. 5, as the chair is rocked backward the spring M' is wound up by the unwinding of the cord from the spool $F^3$, while at the same time the fan is revolved. Now, as the chair is rocked forward once more, the spring will unwind and will wind up the cord L on the spool $F^3$. In either case it will be seen that the reciprocating motion of the chair gives a continuous motion to the fan.

The ratchet and pawl should either or both be made of papier-maché, celluloid, or other suitable material, whereby the minimum amount of noise is obtained. The other parts of the apparatus should also be constructed so as to work as quietly as possible.

A short cord T, having a hook $t$, may be fastened to the eye $k'$, and when it is desired to move the chair this hook may be hooked over one side of the frame H, the cord T supporting the standard K and rod P out of contact with the floor.

It will be seen that with the herein-described apparatus all the parts are entirely out of the way of the occupant of the chair, and also that the chair may be turned in any desired position while the occupant is in it, and may be moved from place to place without in any way deranging the mechanism for operating the fan.

It will be noted that the herein-described apparatus may be readily adapted to any size or shape of rocking-chair or cradle, and that the mechanism for operating the fan may be readily detached from the chair or cradle and reapplied thereto whenever desired. These and the various other advantages of the herein-described apparatus would readily suggest themselves to any practical mind.

Having thus described our invention, what we claim, and desire to secure by Letters Patent of the United States, is—

1. In a fan attachment for rocking chairs, the combination with a fan support attached to the chair, and moving therewith of a fan shaft journaled in said support, a fan revolubly mounted on said shaft, a pawl and friction disk connecting said fan with said shaft, a spool or drum fast on said shaft, a cord held at one end and at the other wound around said spool or drum, a coil spring fast at one end to said fan shaft and at the other to said fan support and tending to keep said cord taut, and means operated by the motion of the chair for unwinding said cord against the action of said spring, and then allowing said spring to wind up said cord again, substantially as and for the purposes described.

2. In a fan attachment for rocking chairs, the combination with a fan support attached to the chair, and moving therewith, of a fan shaft journaled in said support, a fan revolubly mounted on said shaft, a pawl and friction disk connecting said fan with said shaft, a spool or drum fast on said shaft, a roller frame attached to said fan support, rollers mounted in said frame, a standard adapted to pass between said rollers as they move with the chair, a cord fast at one end to said standard, passing over one of said rollers and winding around the said spool or drum, a spring normally keeping said cord taut, a cross bar secured to the rockers of the chair, a bar pivotally connected to the said crossbar and extending to the rear, rollers on the end of said bar, and a pivotal connection between said rearwardly-extending bar and said standard, substantially as described.

3. In a fan attachment for rocking chairs, the combination with a fan support attached to the chair, and moving therewith, a fan shaft journaled in said support, a fan revolubly mounted on said shaft, a pawl and friction disk connecting said fan with said shaft, a spool or drum fast on said shaft, a roller frame attached to said fan support, rollers mounted in said frame, a standard adapted to pass between said rollers as they move with the chair, a cord fast at one end to said standard, passing over one of said rollers and winding around the said spool or drum, a coil spring rigidly attached at one end to said fan support and at the other to said fan shaft, a cross bar secured to the rockers of the chair, a bar pivotally connected to the said crossbar and extending to the rear, rollers on the end of said bar, and a pivotal connection between said rearwardly extending bar and said standard, substantially as described.

4. In a fan attachment for rocking chairs, the combination with a fan support attached to the chair, and moving therewith of a fan shaft journaled in said support, a fan revolubly mounted on said shaft, a pawl and friction disk connecting said fan with said shaft, a spool or drum fast on said shaft, a roller frame attached to said fan support, a plain roller mounted in the end of said frame, a roller H' having three grooves mounted in the frame adjacent to the plain roller, a standard pivoted near the floor and adjusted to pass between the said rollers in one of the grooves in the roller H', as the said rollers move with the chair, a cord fast at one end to said standard passing around the roller H' in one of the grooves thereof, winding around the said spool or drum, and passing around in the other groove of the roller H', and a spring normally keeping said cord taut, substantially as described.

5. The combination with a support adapted to be attached to the back of a rocking chair, of a shaft journaled in the support, a disk loose on the shaft and carrying a fan, a spool or drum and a pawl fast on the shaft, a vertical rod resting on the floor and a cord passing over the spool or drum and connected at its opposite ends to the rod.

6. The combination with a support adapted to be attached to the back of a rocking chair, of a shaft journaled in the support, a disk loose on the shaft and carrying a fan, a spool or drum, and a pawl fast on the shaft, a vertical rod resting on the floor, a cord passing over the spool or drum and connected at its opposite ends to the rod and a spring acting to keep the cord taut.

7. The combination with a support adapted to be attached to the back of a rocking chair, of a shaft journaled in the support, a disk loose on the shaft and carrying a fan, a spool or drum and a pawl fast on the shaft, a vertical rod resting on the floor, rollers on the frame between which the rod works, a cord passing over the spool or drum and connected at its opposite ends to the rods and a spring acting to keep the cord taut.

In testimony whereof we affix our signatures in presence of two witnesses.

WILLIAM H. BOFINGER.
AUGUST O. TANNENBERG.

Witnesses:
ROBERT H. MARR,
WILLIAM C. McLEOD.